Patented Dec. 1, 1953

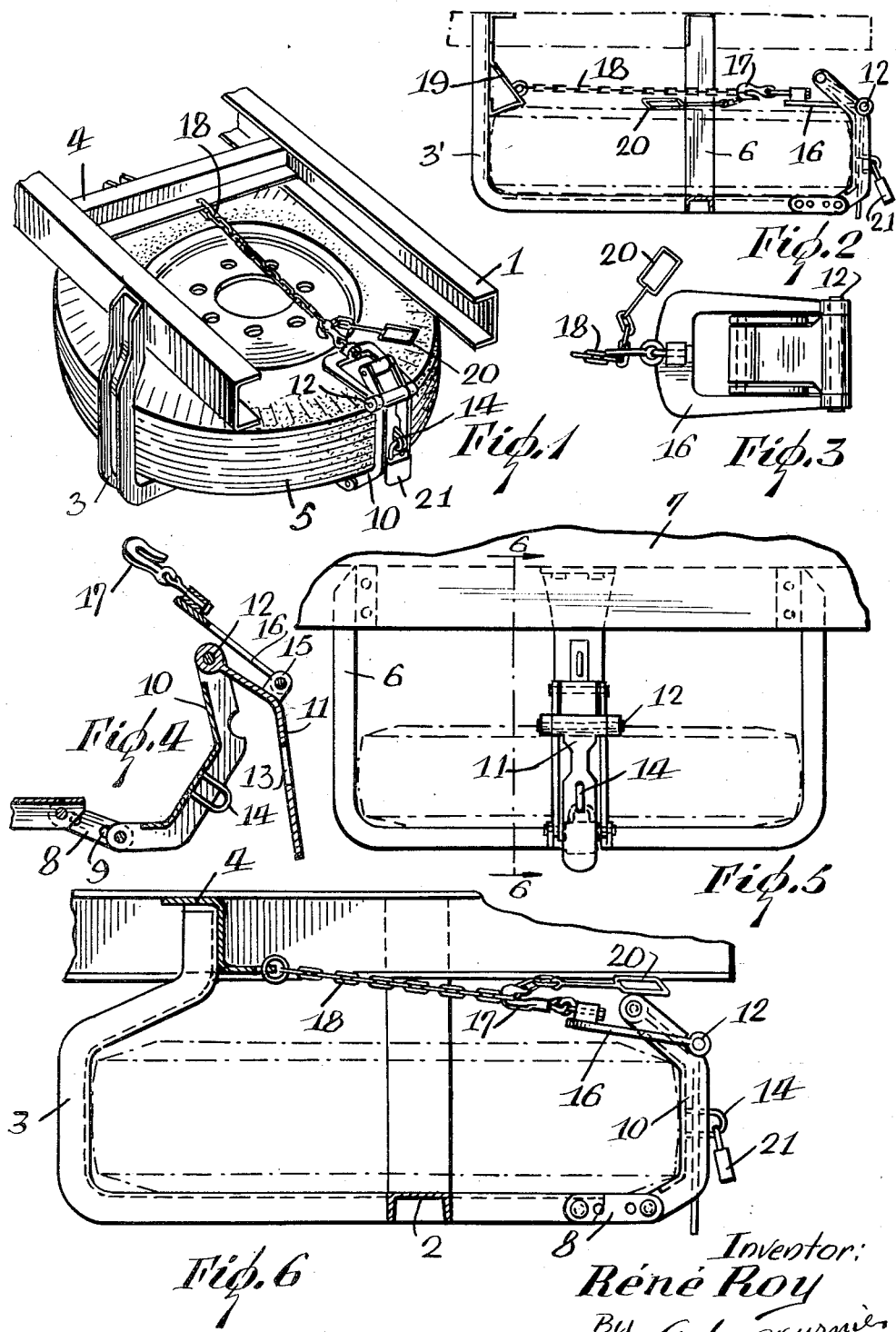

2,661,131

UNITED STATES PATENT OFFICE 2,661,131

SPARE TIRE CARRIER

Rene Roy, Plessisville, Quebec, Canada

Application May 19, 1951, Serial No. 227,129

2 Claims. (Cl. 224—42.26)

The present invention pertains to a novel spare tire carrier for motor vehicles such as trucks, jeeps and the like.

Carriers of the type are usually locked by various arrangements of bolts and nuts. The threads become rusty, especially where the carrier is underslung or otherwise exposed to the air, and the bolts must often be sawed to release the tire.

The principal object of this invention is to provide a carrier that locks without threaded parts and does not involve the described difficulty. Another object is to provide such a device constructed of simple and inexpensive parts and easily assembled and operated.

In the accomplishment of these objects, the device includes a cradle suspended from or otherwise carried by the chassis of the vehicle and having one open side for loading and unloading of the spare tire. The cradle has an intermediate member extending to the open side, and to this member is pivotally attached a clamp for the tire. The clamp carries a locking plate pivoted thereto, with means for positively locking the plate against the clamp. To the clamp is pivotally attached a hook, preferably through the medium of the locking plate.

A chain attached to the chassis or cradle lies over the tire and extends toward the hook, which is finally engaged with the chain. The locking plate and hook also provide a toggle action for tightening the chain and the clamp.

The invention is fully disclosed by way of example in the following description and in the accompanying drawings in which:

Figure 1 is a perspective view of the device in a form that unloads from the rear of the vehicle;

Figure 2 is a side elevation of a side-unloading embodiment;

Figure 3 is a detail plan view;

Figure 4 is a detail vertical section;

Figure 5 is an end view of the form shown in Figure 2;

Figure 6 is a side elevation of the form shown in Figure 1.

Reference to these views will now be made by use of like characters which are employed to designate corresponding parts throughout.

In several of the figures is shown a portion 1 of the chassis of a motor vehicle such as a truck or jeep. In Figures 1 and 6 a stirrup 2 is suspended from the sides of the frame and crosses an L-shaped longitudinal member 3 which is suspended from a transverse frame member 4. A cradle is thereby formed, which is open at the rear to receive and unload a spare tire 5.

In Figures 2 and 5 a similar cradle 6 is suspended from the chassis 7 and is positioned so that the open side thereof is disposed at a side of the vehicle. Thus, the device is suitable for side or end loading, according to the construction of the chassis. The retaining and locking parts, presently to be described, are alike in both cases.

To the free end of the intermediate cradle member 3 or 3' is pivotally attached a link 8 having end slots 9. A clamping member 10 of channel cross section is attached to the outer end of the link and carries at its upper end a locking hinge plate 11 held by a hinge pin 12. The plate 11 conforms to the angular shape of the member 10 and has a slot 13 for receiving a shackle 14 on said member.

Above the slot 13 the plate 11 carries a pair of ears 15 to which are pivoted the free ends of a clevis 16. To the back of the clevis is attached a hook 17 for a purpose that will presently appear. A chain 18 is attached to the midpoint of the crossbar 4 in Figure 1 or to a bracket 19 on the intermediate cradle member 3' in Figure 2. On the free end of the chain is a pull ring 20. When the chain is drawn tight thereby, the hook 17 is thrown into one of the links thereof. At this time the plate 11 may be somewhat spaced from the clamping member 10, and when it is pressed against this member it further tightens the chain to hold the member firmly against the tire. The slot 13 receives the shackle 14, and a padlock 21 is applied on the latter, as shown in Figures 1, 2 and 6.

The invention thus provides a tire carrier that requires no bolts and nuts and is free of the attendant difficulties, as previously set forth. The device is simple and inexpensive in construction and enables side or end loading and unloading of the tire.

Although a specific embodiment of the invention has been illustrated and described, it will be understood that various alterations in the details of construction may be made without departing from the scope of the invention as indicated by the appended claims.

What I claim is:

1. A lock for a tire carrier comprising a fixed member, a clamping member pivoted at one end to said fixed member, a locking plate pivoted to the other end of said clamping member, a shackle on said clamping plate, said locking plate having a slot positioned to receive said shackle, a chain extending from said fixed member, and a hook pivoted to said locking plate and adapted to lock with said chain.

2. A lock for a tire carrier comprising a fixed member, a clamping member pivoted at one end to said fixed member, a locking plate pivoted to the other end of said clamping member, a shackle on said clamping plate, said locking plate having a slot positioned to receive said shackle, a chain extending from said fixed member, a clevis pivoted to said locking plate, and a hook carried by said clevis and adapted to lock with said chain.

RENE ROY.

References Cited in the file of this patent

UNITED STATES PATENTS

| Number | Name | Date |
|---|---|---|
| 1,178,172 | Miller | Apr. 4, 1916 |
| 1,338,630 | Horrocks | Apr. 27, 1920 |
| 1,386,401 | Grams | Aug. 2, 1921 |
| 1,578,823 | Green | Mar. 30, 1926 |